(12) United States Patent
Honda et al.

(10) Patent No.: US 9,723,217 B2
(45) Date of Patent: Aug. 1, 2017

(54) IMAGING DEVICE AND CONTROL METHOD FOR IMAGING DEVICE

(71) Applicant: Olympus Corporation, Shibuya-ku, Tokyo (JP)

(72) Inventors: Tsutomu Honda, Hachioji (JP); Hiroaki Iwasaki, Niiza (JP); Yoichiro Okumura, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/924,072

(22) Filed: Oct. 27, 2015

(65) Prior Publication Data

US 2016/0127656 A1    May 5, 2016

(30) Foreign Application Priority Data

Oct. 30, 2014    (JP) .................... 2014-221449

(51) Int. Cl.
*H04N 5/235*    (2006.01)

(52) U.S. Cl.
CPC ......... *H04N 5/2352* (2013.01); *H04N 5/2351* (2013.01)

(58) Field of Classification Search
CPC . H04N 5/2352; H04N 2101/00; H04N 5/2351
See application file for complete search history.

(56) References Cited

U.S. PATENT DOCUMENTS 8,023,004 B2 *   9/2011   Asoma ............... H04N 5/23245
                                                         348/221.1

FOREIGN PATENT DOCUMENTS

JP    2007-189295    7/2007

* cited by examiner

*Primary Examiner* — Twyler Haskins
*Assistant Examiner* — Angel L Garces-Rivera
(74) *Attorney, Agent, or Firm* — John C. Pokotylo; Straub & Pokotylo

(57) ABSTRACT

An imaging device that photographs a moving image, comprising: an imaging unit configured to repeatedly obtain image data of one frame in a first cycle, further divide a period of the one frame into periods of a predetermined number of divided frames, and repeatedly output divided image data for each divided frame; a gain application section configured to detect object luminance and apply a gain to a plurality of pieces of divided image data; and a synthesis processing section configured to combine the plurality of pieces of divided image data, to generate combined image data of one frame, wherein, when the plurality of pieces of divided image data is obtained in the imaging unit, the number of divided frames is not changed during the period of the first cycle, and wherein, when the number of divided frames is changed for a next cycle of the first cycle.

8 Claims, 6 Drawing Sheets

FIG. 3A  INCREASE NUMBER OF FRAMES

| NUMBER OF FRAMES | 1 | 2 | 3 | 4 | 5 | 6 | 7 | 8 |
|---|---|---|---|---|---|---|---|---|
| GAIN | 1 | 2 | 1.5 | 1.33 | 1.25 | 1.2 | 1.17 | 1.14 |

FIG. 3B  DECREASE NUMBER OF FRAMES

| NUMBER OF FRAMES | 8 | 7 | 6 | 5 | 4 | 3 | 2 | 1 |
|---|---|---|---|---|---|---|---|---|
| GAIN | 1 | 0.88 | 0.86 | 0.83 | 0.8 | 0.75 | 0.67 | 0.5 |

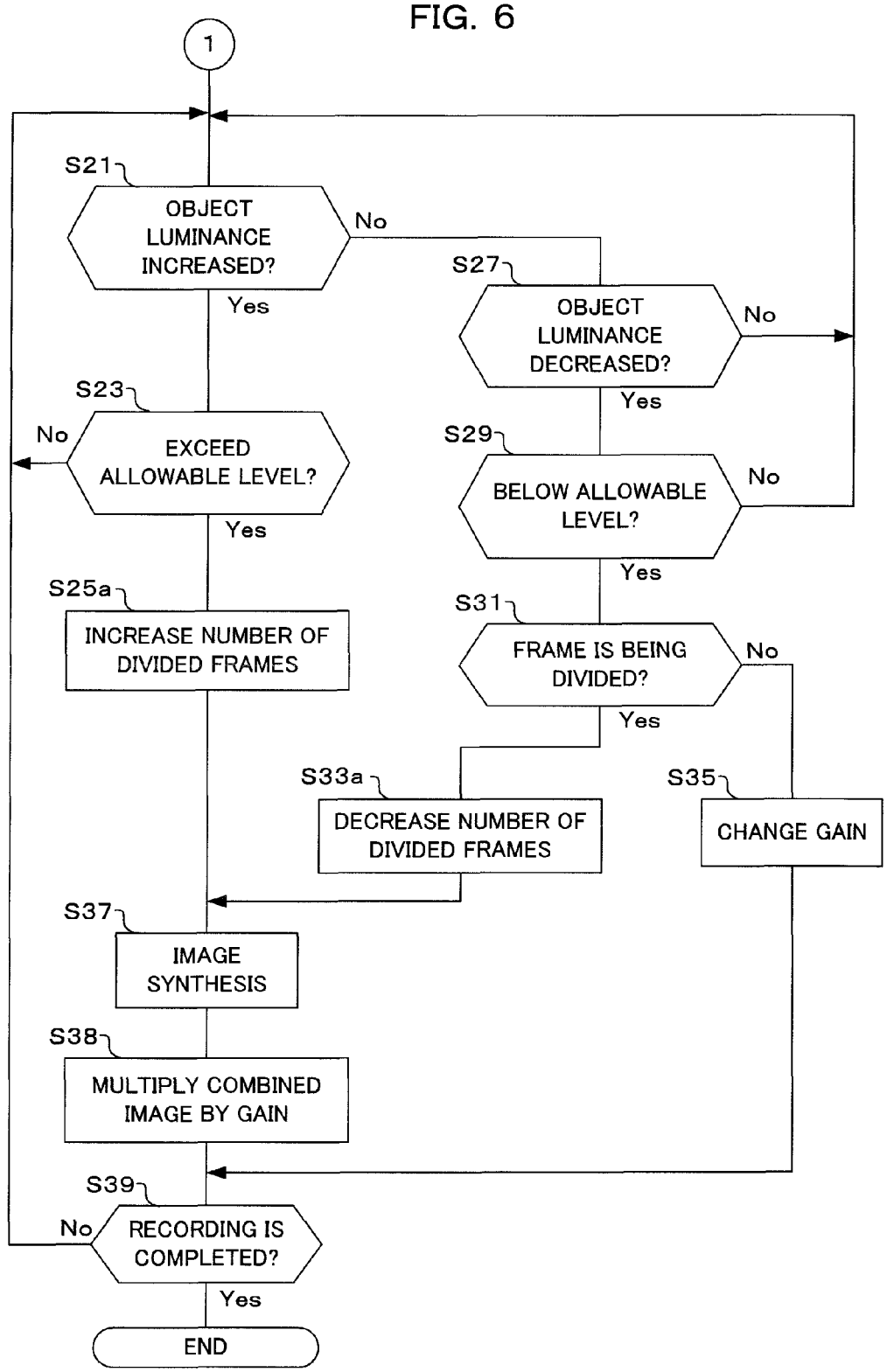

IMAGING DEVICE AND CONTROL METHOD FOR IMAGING DEVICE

Benefit is claimed, under 35 U.S.C. §119, to the filing date of prior Japanese Patent Application No. 2014-221449 filed on Oct. 30, 2014. This application is expressly incorporated herein by reference. The scope of the present invention is not limited to any requirements of the specific embodiments described in the application.

BACKGROUND OF THE INVENTION

1. Field of the Invention

The present invention relates to an imaging device that divides, in photographing a moving image, an exposure period of one frame and combines a plurality of pieces of image data, which is obtained in the divided frames, to generate image data of one frame, and relates to a control method for the imaging device.

2. Description of Related Art

In moving image photographing, image data is obtained at a predetermined frame rate. On the other hand, exposure control is determined in accordance with luminance of an object (field). Therefore, if the shutter speed is high, then in reproducing an image, an object does not smoothly and continuously move but intermittently moves, resulting in a moving image like a cutoff animation. Then, in an imaging device disclosed in Japanese Patent Laid-Open Publication No. 2007-189295 (hereinafter, referred to as "Patent Literature 1"), with respect to a moving object, the shutter speed is reduced and the edge enhancement is reduced, while with respect to a stationary object, the shutter speed is increased and the edge enhancement is increased.

SUMMARY OF THE INVENTION

Because there is restriction on the frame rate in reproducing a moving image, the moving image is recorded in accordance with this restriction. For example, in the case of a full high definition television (2K moving images), there is the specification of 60 fps (frame per sec) or 30 fps, in which 60 frames or 30 frames of images are photographed per second, respectively. In this case, in order to maintain the brightness of an image constant, the aperture, gain, and ND filter are changed in accordance with the shutter speed.

In the case of a moving object, all movements basically cannot be recorded unless the shutter speed matches the frame rate at which the movements of the object are recorded (e.g., in the case of HD30P, the shutter speed is 1/30 sec). As the result, a low shutter speed cannot be set and if a high shutter speed is set, a period during which a part of the moving object is not exposed will be generated. Accordingly, the shutter speed is determined in accordance with the specification under which the movements of the object are recorded. Therefore, even if the shutter speed is varied incompletely in accordance with the object luminance, a feeling of cutoff cannot be completely eliminated.

A method might be contemplated for inserting and removing an ND filter at high speed in accordance with the object luminance, or for operating the aperture at high speed following a change in the object luminance. However, with such a method, in inserting and removing an ND filter or when the aperture varies, an image with output change will be generated in a display image even for a moment and human eyes perceive that an object image twinkles. Therefore, in higher-definition moving image photographing, the quality of a video will degrade. Although it is possible to follow a change in the object luminance by changing the gain, the gain tends to be reduced as the object luminance increases. However, even if the gain is reduced to 0 dB or less, the linearity cannot be secured with regard to a pixel of an imaging element whose output has been already saturated.

The above-described problem can be solved if the aperture is slowly moved. However, the aperture needs to be moved at high speed in photographing a still image and therefore a camera having both the function to photograph a moving image and the function to photograph a still image must have two apertures for photographing a still image and for photographing a moving image (i.e., two aperture driving mechanisms), thus causing an increase in size of devices. A compact camera without an aperture mechanism cannot resolve the above-described problem because it has only the ND filter.

The present invention has been made in view of the above circumstances and provides an imaging device capable of photographing a moving image that does not give a user any feeling of cutoff even when the object luminance varies, and provides a control method for the imaging device.

According to an aspect of the preset invention, there is provided an imaging device that photographs a moving image, comprising: an imaging unit configured to repeatedly obtain image data of one frame in a first cycle, further divide a period of the one frame into periods of a predetermined number of divided frames, and repeatedly output divided image data for each divided frame; a gain application section configured to detect object luminance and apply a gain to a plurality of pieces of divided image data output from the imaging unit; and a synthesis processing section configured to combine the plurality of pieces of divided image data, to which the gain is applied by the gain application section, to generate combined image data of one frame, wherein, when the plurality of pieces of divided image data is obtained in the imaging unit, the number of divided frames is not changed during the period of the first cycle, and when the number of divided frames is changed for a next cycle of the first cycle, the gain application section changes the gain so as to obtain substantially the same image output in the next cycle.

According to another aspect of the preset invention, there is provided a control method for an imaging device that photographs a moving image, the method comprising: an imaging step of repeatedly obtaining image data of one frame in a first cycle, further dividing a period of the one frame into periods of a predetermined number of divided frames, and repeatedly outputting divided image data for each divided frame; a gain application step of detecting object luminance and applying a gain to a plurality of pieces of divided image data output in the imaging step; and a synthesis processing step of combining the plurality of pieces of divided image data, to which the gain is applied in the gain application step, to generate combined image data of one frame, wherein, when the plurality of pieces of divided image data is obtained in the imaging step, the number of divided frames is not changed during the period of the first cycle, and when the number of divided frames is changed for a next cycle of the first cycle, the gain application step changes the gain so as to obtain substantially the same image output in the next cycle.

According to yet another aspect of the preset invention, there is provided an imaging device that photographs a moving image, comprising: an imaging unit configured to repeatedly obtain image data of one frame in a first cycle, further divide a period of the one frame into periods of a predetermined number of divided frames, and repeatedly output divided image data for each divided frame; a synthesis processing section configured to combine a plurality of pieces of divided image data output from the imaging unit, to generate combined image data of one frame; and a gain application section configured to detect object luminance, apply a gain to a combined image generated from the synthesis processing section, and output image data, wherein, when the plurality of pieces of divided image data is obtained in the imaging unit, the number of divided frames is not changed during the period of the first cycle, and when the number of divided frames is changed for a next cycle of the first cycle, the gain application section changes the gain so as to obtain substantially the same image output in the next cycle.

According to yet another aspect of the preset invention, there is provided a control method for an imaging device that photographs a moving image, the method comprising: an imaging step of repeatedly obtaining image data of one frame in a first cycle, further dividing a period of the one frame into periods of a predetermined number of divided frames, and repeatedly outputting divided image data for each divided frame; a synthesis processing step of combining a plurality of pieces of divided image data output in the imaging step, to generate combined image data of one frame; and a gain application step of detecting object luminance and applying a gain to a combined image output in the synthesis processing step, wherein, when the plurality of pieces of divided image data is obtained in the imaging step, the number of divided frames is not changed during the period of the first cycle, and when the number of divided frames is changed for a next cycle of the first cycle, the gain application step changes the gain so as to obtain substantially the same image output in the next cycle.

BRIEF DESCRIPTION OF THE DRAWINGS

FIG. 3A and FIG. 3B are tables showing a relationship between the number of divisions per frame and a gain in the camera according to the embodiment of the present invention.

FIG. 6 is a flowchart showing the operation of the camera according to a variation of the embodiment of the preset invention.

DETAILED DESCRIPTION OF THE PREFERRED EMBODIMENTS

Hereinafter, a preferred embodiment is described with reference to the drawings, using a camera to which the present invention is applied. The camera according to the preferred embodiment of the preset invention is a digital camera. This camera generally performs live-view display, on a display device, of image data based on an image signal that is read from an imaging element and also performs moving image photographing at a predetermined frame rate in response to an operation of a video button, and records, in an external memory, image data of a moving image image-processed for recording. Then, when the object luminance increases, one frame is divided and each image data obtained in this divided frame (hereinafter, this data is referred to as "divided image data") is combined to generate one frame of image data. When the object luminance decreases in a divided frame during photographing, the number of divided frames is reduced.

Figure 1:
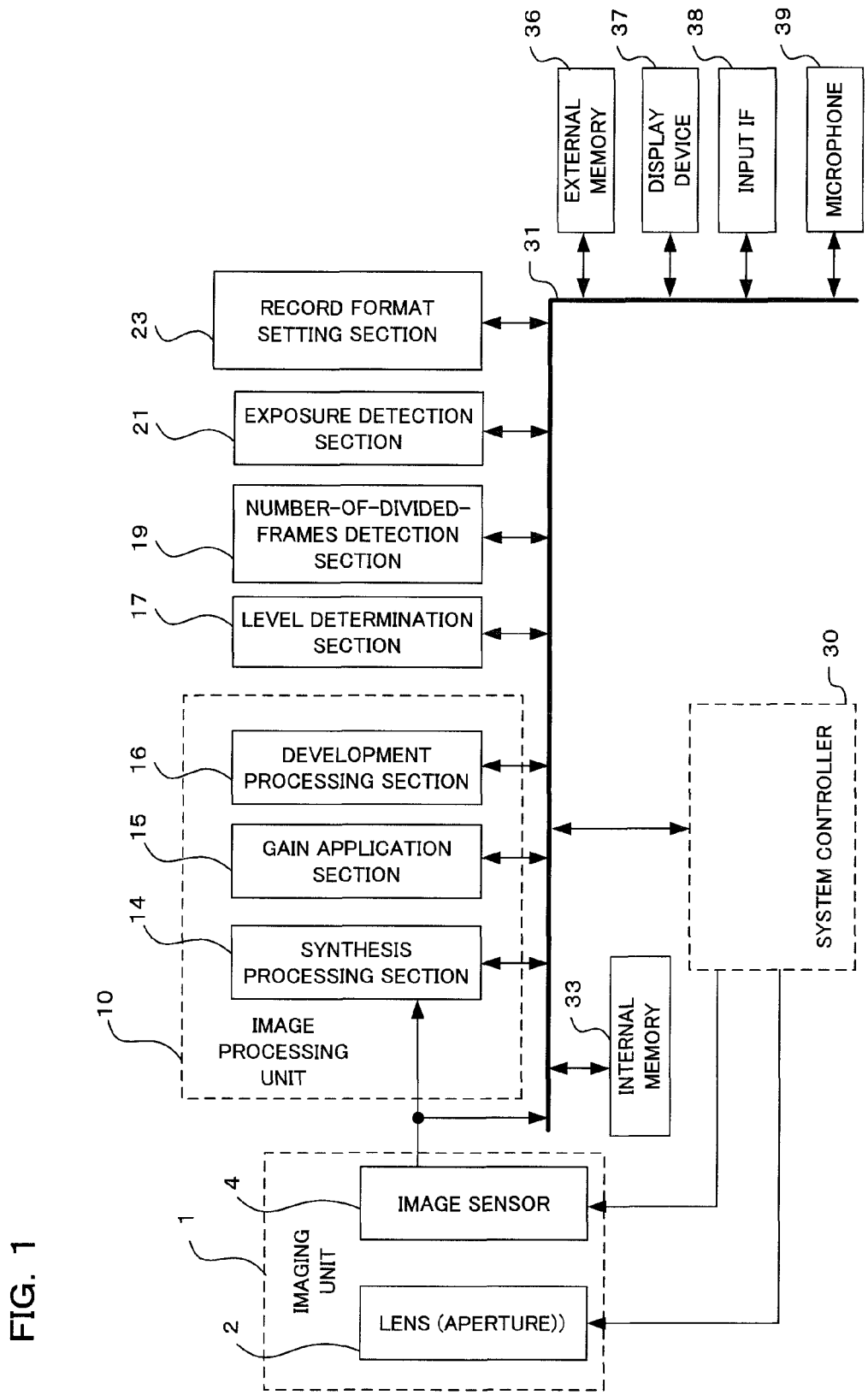
FIG. 1 is a block diagram mainly showing an electric circuit of a camera according to an embodiment of the present invention.

FIG. 1 is a block diagram mainly showing an electric configuration of a camera according to an embodiment of the present invention. The camera in the embodiment includes an imaging unit 1, an image processing unit 10, a system controller 30, a bus 31, and each section connected thereto. Note that, in the embodiment, a lens 2 in the imaging unit 1 is integrally formed with a camera body, but it is needless to say that the lens 2 is not limited to the integral-type but may be an interchangeable lens corresponding to a lens interchangeable camera.

The lens 2 and an image sensor 4 are provided in the imaging unit 1. The lens 2 forms an optical image of an object onto the image sensor 4. An aperture that adjusts the aperture value for adjusting exposure is provided in the lens 2. The image sensor 4 includes an imaging element, such as a CMOS image sensor or a CCD image sensor, converts the optical image of an object formed by the lens 2 into an electric signal for each pixel in accordance with an instruction from the system controller 30, and outputs the image signal to the image processing unit 10 and the bus 31. The bus 31 is a signal line for transmitting and receiving signals between blocks.

The image sensor 4 includes an electronic shutter, such as a global shutter or a rolling shutter, and is capable of controlling the exposure time corresponding to one frame or a divided frame. The image sensor 4 is capable of repeatedly obtaining image data of one frame in a first cycle. The image sensor 4 furthermore functions as an imaging unit configured to divide the exposure period of one frame into the exposure periods of a predetermined number of divided frames, and repeatedly output divided image data for each of the divided frames.

With regard to the image of one frame constituting a moving image, the divided image data is repeatedly output in a second cycle from the imaging unit as a plurality of divided images, and the second cycle and the change of the gain are in synchronization with the change timing at which the plurality of divided images forms the image of one frame constituting the moving image. That is, as described later using FIG. 2, the exposure period of one frame is divided into the exposure periods of a plurality of divided frames. The number of divisions of one frame and the gain vary with a change in the object luminance, but during the period of exposing one frame, the number of divisions is not changed but the gain is varied so as to obtain substantially the same image output level.

The image processing unit 10 performs image processing on an image signal output from the image sensor 4 and includes a synthesis processing section 14, a gain application section 15, and a development processing section 16. The image processing unit 10 performs processing (usually referred to as basic image processing), such as error correction, OB (Optical Black) adjustment, WB correction, demosaicing, color-conversion correction, and gradation conversion, on the image signal output from the image sensor 4. These adjustment, correction, and conversion may have a characteristic curve with respect to an input value, and therefore do not necessarily have a linear characteristic. Accordingly, the image output level is not necessarily output with a value proportional to an input value in accordance with a change in the object luminance.

The synthesis processing section 14 performs processing to combine outputs, for each corresponding pixel, of the pieces of image data corresponding to a plurality of divided frames read from the image sensor 4 to generate combined image data. Examples of the synthesis processing include additive average synthesis, comparative bright synthesis, comparative dark synthesis, comparative bright synthesis with a predetermined threshold, and comparative dark synthesis with a predetermined threshold.

The comparative bright synthesis in the synthesis processing section 14 compares outputs, for each corresponding pixel, of the plurality of pieces of image data read from the image sensor 4, and sets a larger pixel output to pixel data of a combined image. The comparative dark synthesis compares outputs for each corresponding pixel, and sets a smaller pixel output to pixel data of the combined image. The additive average synthesis adds and averages outputs, for each corresponding pixel, of the plurality of pieces of image data read from the image sensor 4 to generate a combined image. The comparative bright synthesis with a predetermined threshold and the comparative dark synthesis with a predetermined threshold determine whether or not to perform the synthesis in accordance with whether or not there is any difference equal to or greater than the threshold in comparing the output for each pixel with each other in the comparative bright synthesis and in the comparative dark synthesis.

The synthesis processing section 14 functions as a synthesis processing section that combines a plurality of pieces of divided image data, to which a gain is applied by the gain application section, to generate combined image data of one frame. The synthesis processing section performs image synthesis to generate image data of one frame using all pieces of the divided image data read during a period constituting one frame.

The gain application section 15 multiplies the image data by a predetermined gain value. The gain value also has a negative gain other than a positive gain. As an example of the negative gain, multiplying by a gain value of ½ reduces the output of image data to a half thereof, and thus a darkening effect equal to the effect of an ND2 filter (filter for reducing the amount of light to ½) can be obtained.

As described later, when the number of divided frames is increased or decreased in response to the object luminance, the gain application section 15 applies a gain corresponding to the number of divisions in order to suppress a change in the brightness of an image (see FIG. 3 described later). The gain is calculated taking into consideration the image output of the basic image processing. The gain is adjusted so that substantially the same image output is obtained even when the number of divided frames varies during the period of one frame. Even if the level of an image output has slightly fluctuated, human eyes perceive that the output level is the same, so that a change in the image output level to the extent that human eyes cannot perceive any fluctuation can be regarded as substantially the same. Therefore, a photographer does not feel discomfort even if the number of divisions varies between frames. The gain application section 15 functions as a gain application section that applies a gain to a plurality of pieces of divided image data output from the imaging unit 1. To the image data that is not divided, the gain application section 15 applies a gain corresponding to the information about the object luminance detected by an exposure detection section 21 described later.

The development processing section 16 performs development processing, such as demosaicing (synchronization processing), white balance adjustment, gamma correction, and image compression, on RAW image data (image data before the development processing) generated by the synthesis processing section 14.

A level determination section 17 determines the output level of pixel data. In the embodiment, the number of divisions (number of divided frames), by which the imaging is repeated per frame, is determined so that pixel data will not reach a saturation level, and the level determination section 17 determines whether or not the pixel data has reached the saturation level. Whether or not the pixel data has reached the saturation level is determined using the saturation output with the number of bits corresponding to that of the RAW image data. The output level of pixel data may be displayed so that a user determines the output level and sets the number of divided frames while adjusting the output level.

When the level determination section 17 determines that the pixel output of the image data will be saturated, a number-of-divided-frames detection section 19 detects the number of divided frames, by which the image data from the image sensor 4 will not be saturated. Specifically, during a live-view display before the start of recording, a predetermined exposure time of one frame is divided, and exposure is performed in the time of this divided frame. Then, the level determination section 17 determines whether or not the pixel data is saturated, and increases the number of divided frames until the pixel data will not be saturated. On the other hand, when the image data is saturated after the start of recording, the number of divisions is gradually increased one by one. As the method for gradually increasing the number of divisions, there may be the one for increasing the number of divisions one by one in terms of a plurality of frames so as not to abruptly change the number of divisions. The cycle (second cycle) of the divided frame uses a value obtained by dividing the cycle (first cycle) of one frame by an integer of 2 or more in the embodiment, but may be a cycle which cannot be perfectly divided by an integer of 2 or more.

Note that, the number of divided frames may be increased until all the pieces of pixel data are not saturated, but the number of divided frames may be increased until the number of saturated pixels becomes equal to or less than a predetermined ratio with respect to the number of all the pixels. Actually, other than detecting the level of pixel data while changing the number of divided frames, the number of divided frames may be calculated based on the level (average output level, peak output level, or the like) of pixel data, for example. A specific operation to divide one frame is described in S9 to S13 of FIG. 4 described later.

The exposure detection section 21 receives image data from the image sensor 4, detects the object luminance, and outputs information about the detected object luminance to the gain application section 15, the system controller 30, and the like. The gain application section 15 calculates a gain based on the obtained object luminance and applies the gain, as described above.

A record format setting section 23 sets a record format in response to a specification via an input IF 38 made by a user. In recording a moving image, a record format is set by the record format setting section 23 from among various kinds of record formats. For example, in the case of HD30P, one frame takes ⅟30 second, while in the case of HD60P, it takes ⅟60 second.

An internal memory 33, an external memory 36, a display device 37, the input IF 38, a microphone 39, and the system controller 30 are connected to the bus 31, in addition to the imaging unit 1, image processing unit 10, level determination section 17, number-of-divided-frames detection section 19, exposure detection section 21, and record format setting section 23.

The internal memory 33 stores various kinds of configuration data required for the operation of a camera and a program code required for the system controller 30 to perform, or temporarily stores the image in an intermediate stage during image processing. The internal memory 33 comprises a nonvolatile memory, such as a flash memory, and a volatile memory, such as a DRAM.

The external memory 36 is a nonvolatile storage medium that is loadable into a camera body or fixed to the inside of the camera, and is for example a SD card, a CF card, or the like. The external memory 36 is capable of recording the image data developed by the development processing section 16, while during reproduction, the recorded image data can be read from the external memory 36 and displayed on the display device 37 or output to the outside of the camera.

The display device 37 comprises a back display device and EVF (electronic view finder) made of a TFT (Thin Film Transistor) liquid crystal device, an organic EL display device, or the like, and displays the image developed by the development processing section 16.

The input IF 38 includes an operating member, such as a release button or a video button, or a touch panel for inputting a touch operation in the back display device or the like. Here, instructions of photographing operations, such as various kinds of mode setting and/or a moving-image recording instruction, are performed based on a user operation. Setting a record format in the record format setting section 23 is performed via the input IF 38 on a menu screen.

The microphone 39 converts, during recording of a moving image, a peripheral sound into an analog signal. Note that, the analog sound signal is converted into the audio data in a digital format, and is recorded in the external memory 36 together with the image data of a moving image.

The system controller 30 includes a CPU (Central Processing Unit), and controls the whole of the camera in accordance with a program code stored in the internal memory 33. The system controller 30 transmits a control signal to each part in the imaging unit 1 described above. Similarly, the system controller 30 receives an output signal from the imaging unit 1 via the bus 31. Additionally, the system controller 30 transmits and receives a control signal to and from each of the internal memory 33, external memory 36, display device 37, input IF 38, and microphone 39, other than the image processing unit 10, level determination section 17, number-of-divided-frames detection section 19, and exposure detection section 21.

Figure 2:
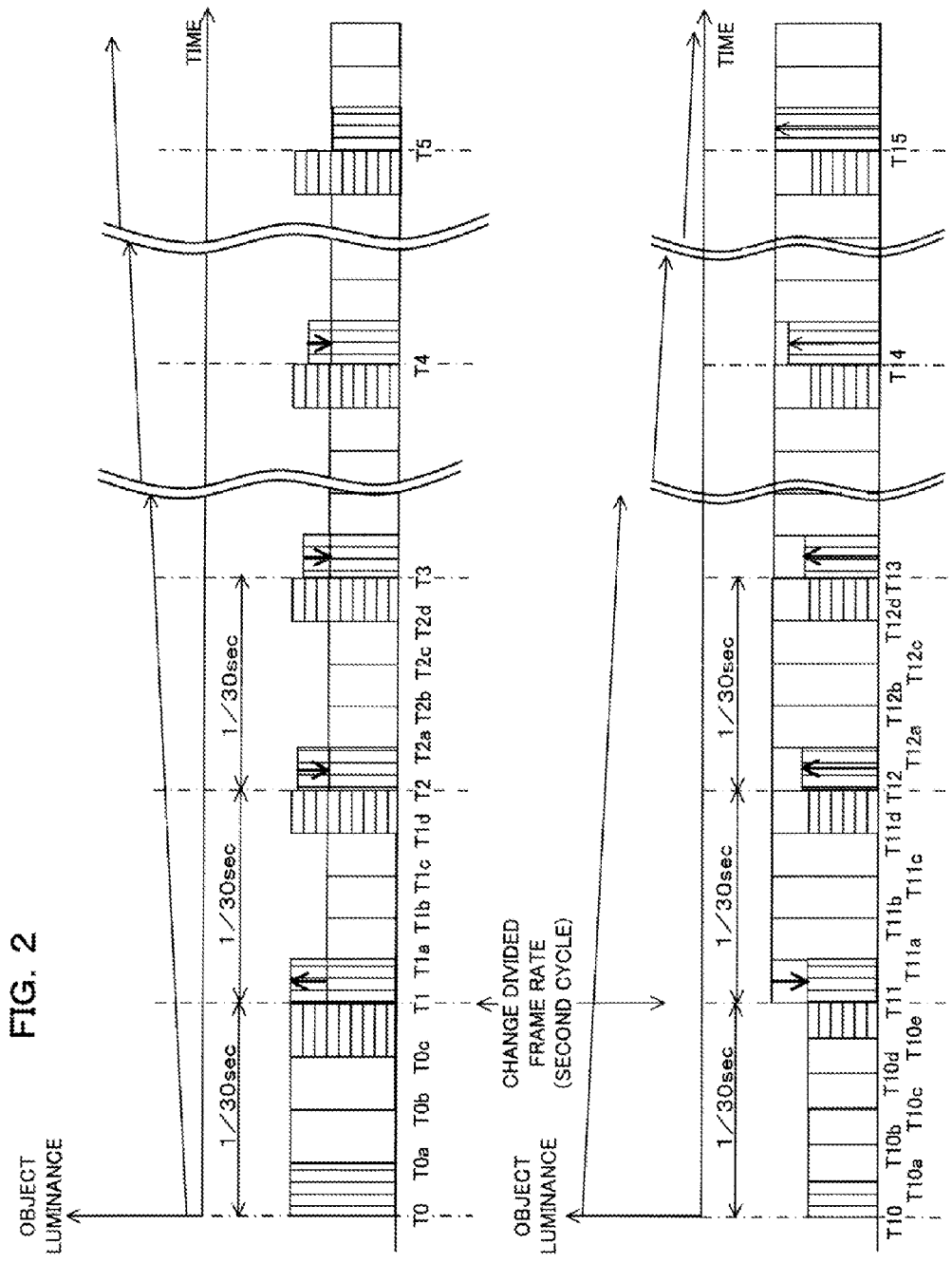
FIG. 2 illustrates how to divide one frame and apply a gain to each divided frame in the camera according to the embodiment of the present invention.

In obtaining a plurality of pieces of divided image data in the imaging unit 1, the system controller 30 does not change the number of divided frames during the period of the first cycle (in one frame), and when the number of divided frames is changed for a next cycle of the first cycle, the gain application section changes the gain so as to obtain substantially the same image output in the next cycle (see FIG. 2).

Next, how to change the number of divided frames and change the gain when the object luminance varies in the embodiment is described using FIG. 2. The upper part of FIG. 2 shows a case where the object luminance gradually increases, while the lower part of FIG. 2 shows a case where the object luminance gradually decreases (see the graphs of a change in the object luminance of FIG. 2). In both the upper part and the lower part of FIG. 2, the frame rate is $1/30$ sec. Note that, in FIG. 2, a divided frame with vertical lines indicates the brightness of a standard level, while a divided frame with horizontal lines indicates the brightness of the level of a video output after applying a gain.

Now, assume that the number of divisions of one frame is four at a time instant T0. Then, at a time instant T1, the exposure detection section 21 detects that the object luminance has increased, and if the level determination section 17 detects the saturation, the number of divisions of one frame changes from four to five. Because the cycle (first cycle) ($1/30$ sec, in this case) of one frame does not vary, the cycle (second cycle) of the divided frame decreases (from $1/120$ sec to $1/150$ sec, in this case). If the number of divisions of one frame is simply increased, the output level of the image data of a divided frame instantaneously decreases and therefore the gain application section 15 applies a positive gain so that the brightness becomes a standard level, thereby preventing a photographer from feeling discomfort.

Note that the arrow in the divided frame between the time instant T1 and a time instant T1$a$ of the upper part of FIG. 2 indicates "an increase of the gain". Hereinafter, as the time elapses to time instants T2, T3, T4, . . . , the object luminance increases and therefore the amount of an increase of the gain in the gain application section 15 decreases. Meanwhile, the gain application section 15 applies a gain to the image data so that the brightness becomes substantially constant, and therefore the video output for recording an image can maintain a substantially constant level (see the divided frame with horizontal lines in the upper part of FIG. 2).

A case where the object luminance decrease is shown in the lower part of FIG. 2. Now, assume that the number of divided frames is six at a time instant T10. Then, at a time instant T11, if the exposure detection section 21 detects that the object luminance has decreased, the number of divided frames changes from six to five. Because the cycle (first cycle) ($1/30$ sec, in this case) of one frame does not change, the cycle (second cycle) of a divided frame becomes longer (from $1/180$ sec to $1/150$ sec, in this case). If the number of divisions of one frame is simply reduced, the output level of the image data of a divided frame instantaneously rises and therefore the gain application section 15 applies a negative gain so that the brightness becomes within a range of variations of brightness which does not make a photographer feel discomfort.

The arrow in the divided frame between the time instant T11 and a time instance T11$a$ of the lower part of FIG. 2 indicates "a decrease in the gain". Hereinafter, as the time elapses to time instants T12, T13, T14, . . . , the object luminance decreases and therefore the amount of a decrease in the gain in the gain application section 15 increases. Meanwhile, the gain application section 15 applies a gain to the image data so that the brightness become constant, and therefore the video output for recording an image can maintain a substantially constant level (see the divided frame with horizontal lines in the lower part of FIG. 2).

As described above, in the embodiment, when the object luminance varies during moving image photographing, the number of divisions of one frame is varied with a change in the object luminance. However, the number of divisions is an integer and thus can take only a discontinuous value and therefore even when the gain application section 15 adjusts the gain applied to image data and the number of divided frames varies, the image data of a substantially constant output level can be obtained so as not make a photographer feel discomfort. Moreover, during the period of one frame, the number of divisions (second cycle) is not changed but the gain is changed. Therefore, in each divided frame, an object image can be continuously exposed without interruption of the exposure period and the divided image data of a substantially constant output level can be obtained.

Next, a relationship between the number of divisions per frame and the gain is described using FIG. 3A and FIG. 3B. In the example shown in the upper part of FIG. 2, the number of divided frames is increased from four to five, while in the example shown in the lower part of FIG. 2, the number of divisions is reduced from six to five. FIG. 3A shows how the gain varies in response to an increase in the number of divided frames when the object luminance increases. If the number of frames increases from one to two, the gain is doubled. When the number of frames increase from one to two to three, the gain is increased by 1.5 times due to 3/2=1.5. As seen from FIG. 3A, the gain can be calculated by dividing a new number of frames by a current number of frames.

FIG. 3B shows how the gain varies in response to a decrease in the number of divided frames when the object luminance decreases. When the number of frames decreases from eight to seven, the gain is increased by 0.88 times. When the number of frames decrease from seven to six, the gain is increased by 0.86 times due to 6/7=0.86. As seen from FIG. 3B, the gain can be calculated by dividing a new number of frames by a current number of frames.

Figure 4:
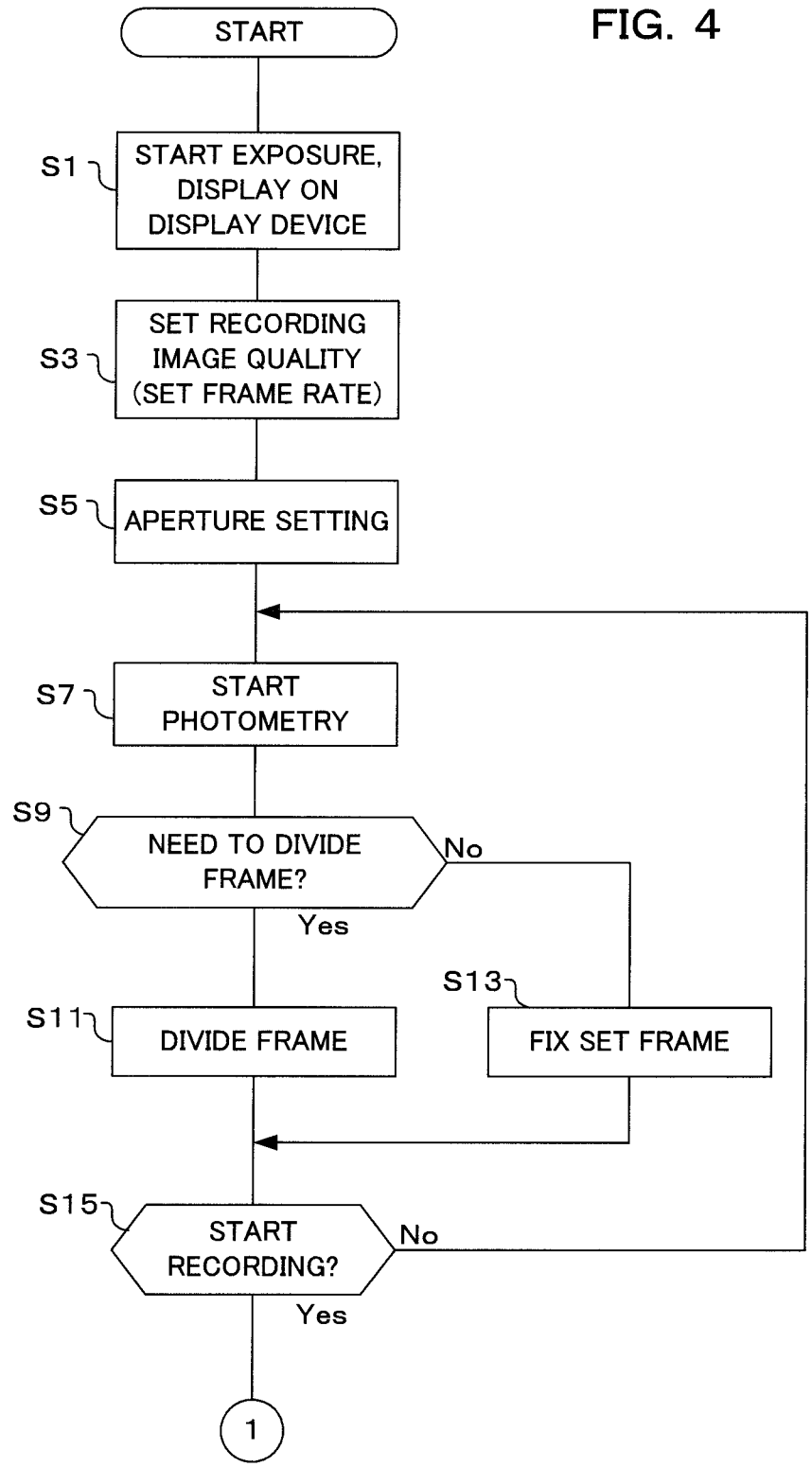
FIG. 4 is a flowchart showing the operation of the camera according to the embodiment of the present invention.
Figure 5:
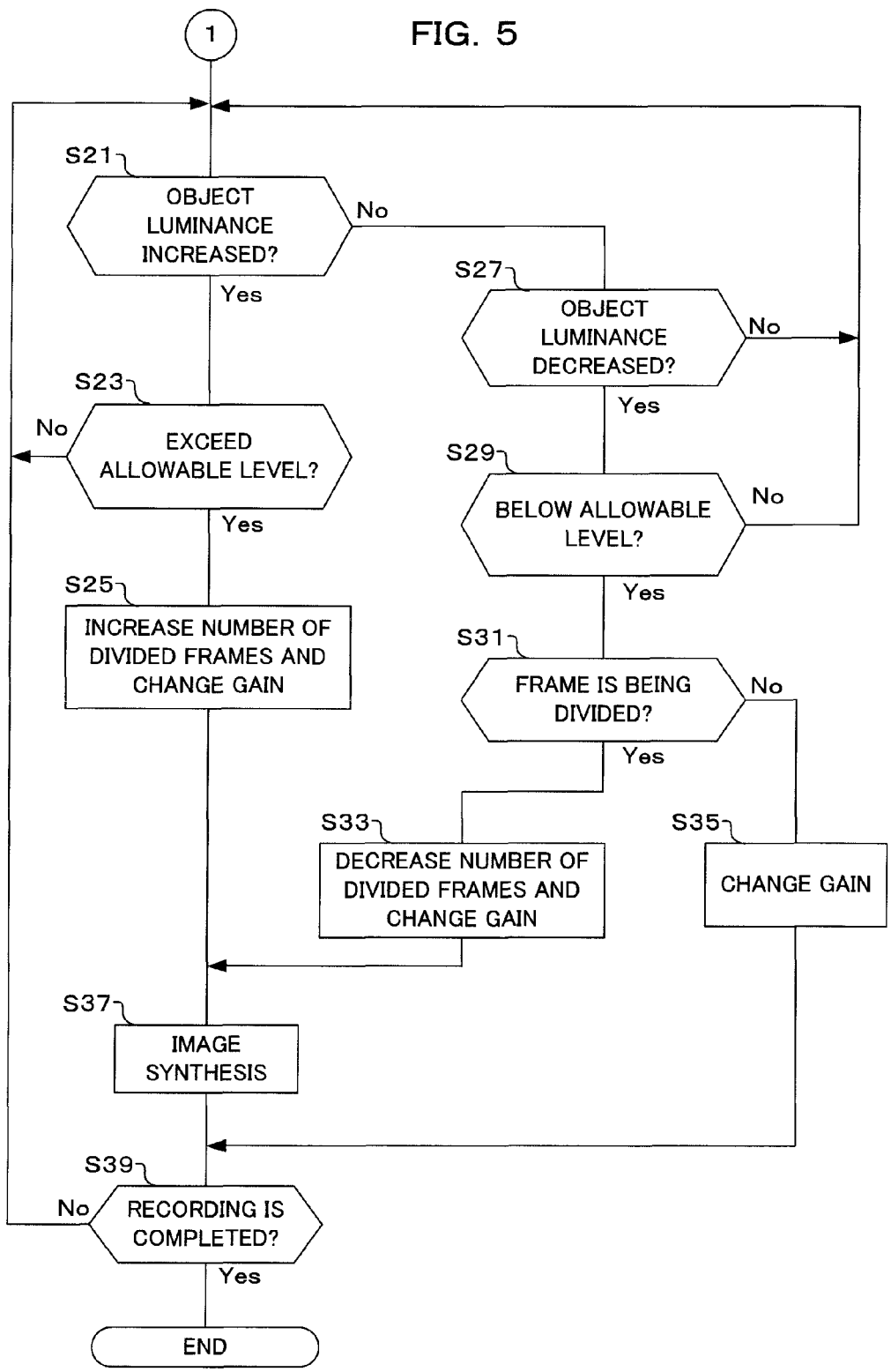
FIG. 5 is a flowchart showing the operation of the camera according to the embodiment of the present invention.

Next, the operation of the embodiment is described using flowcharts shown in FIG. 4 and FIG. 5. These flowcharts are executed by the system controller 30 which controls each section in the camera in accordance with a program code stored in the internal memory 33.

Once power is turned on by a power switch or the like, the flow shown in FIG. 4 starts. First, exposure is started and the display device 37 performs live-view display (S1). Here, the image processing unit 10 performs the image processing for live-view display on the image data from the image sensor 4 and performs live-view display on the display device 37. A photographer observes the live-view display, and determines a composition, and also determines the photographing timing of a still image or the photographing timing of a moving image.

Once live-view display is performed in step S1, then a recording image quality is set (S3). Here, the record format setting section 23 sets a frame rate for recording a moving image, based on a frame rate that is input via the input IF 38. As described above, the frame rate indicates the number of images per second in recording a moving image. A value, such as 30 or 60, is usually set.

Once a recording image quality is set in step S3, then the aperture setting is performed (S5). Here, a required depth of field and/or the state of blurring are confirmed, the aperture value of the aperture (provided inside the lens 2) is calculated, and the aperture is controlled to have this aperture value.

Once the aperture setting is performed in step S5, then the number of divisions, by which imaging is repeated per frame, is detected (S7). Here, based on image data, the number-of-divided-frames detection section 19 detects the number of divisions, by which the pixel data is not saturated in each of divided frames. Specifically, the number of divisions is increased until the level of pixel data becomes equal to or less than a saturation level. Accordingly, if the level of pixel data of the image data obtained at the frame rate set in step S3 is equal to or less than the saturation level, the number of divisions is not increased, while if the level of the pixel data exceeds the saturation level, the number of divisions is increased until the level determination section 17 determines that the level of the pixel data does not exceed the saturation level. Note that, when the level of the pixel data is still too large even if one frame is divided, the aperture value is changed. When the number of divisions is one and the level of the pixel data is small, the aperture is controlled so as to be opened further. The aperture value may be changed before the start of recording, but because the quality of a moving image degrades once recording is started, changing the aperture value is not performed as much as possible.

Once the number of divided frames is detected in step S7, then it is determined whether or not one frame needs to be further divided (S9). Here, determination is made based on the detection result of the number of divided frames in step S7. That is, if the detection result is equal to or less than one, it is determined that one frame does not need to be divided.

When the result of determination in step S9 indicates that frame division is required, setting of frame division is performed (S11). Here, the number of divisions for dividing one frame by the number of divisions detected in step S7 is set.

On the other hand, when the result of determination in step S9 indicates that frame division is not required, the set frame is fixed (S13). Here, the frame rate set in step S3 is set as it is. Note that, when the gain of image data is insufficient, the gain application section 15 applies a gain.

Once frame division or fixing is performed in step S11 or S13, then it is determined whether or not to start recording (S15). Since a photographer, when starting to photograph a moving image, operates a video button (or release button), here the above-described determination is made based on a signal indicative of the operation state of the video button (or release button) that is sent via the input IF 38. When the result of this determination indicates that the recording is not started, the flow returns to step S7 and the procedure such as the above-described live-view display is repeated.

Before the start of recording and during the live-view display, it may be contemplated to make an ingenuity of reducing the consumption current of a battery at the cost of appearance. Specifically, the following may be contemplated: even if the object luminance is at a level that causes image data to be saturated, frame division is not performed and the shutter speed is increased by allowing an object image to intermittently move without smoothly and continuously moving in moving image display, and a period is provided during which the imaging operation is stopped. Other than the above, it may be also contemplated to make ingenuities of providing a timer, and when recording is not started even after a lapse of a predetermined time from the start of a live view, transitioning the flow to the state where the consumption current is reduced, and then returning the flow from this state to the original state by a certain button operation.

On the other hand, when the result of determination in step S15 indicates that the recording is started, moving image photographing is started. Once moving image photographing is started, image processing is performed by the image processing unit 10 every time image data is output. As described later, every time the image data of a divided frame is output, the synthesis processing by the synthesis processing section 14 is performed. Then, once moving image photographing is started, it is determined whether or not the object luminance has been increased (S21). Here, the exposure detection section 21 determines a change in the object luminance, based on the image data. Other than this, a change in the object luminance may be determined using the output of the level determination section 17.

When the result of determination in step S21 indicates that the object luminance has increased, it is determined whether or not the object luminance exceeds an allowable level (S23). Here, it is determined whether or not the object luminance detected by the exposure detection section 21 exceeds a predetermined allowable value. The allowable value may be a value that allows to determine whether or not pixel data will be saturated unless image data is obtained after one frame is divided because the object luminance has increased. When the result of this determination indicates that the object luminance does not exceed the allowable level, the flow returns to step S21.

When the result of determination in step S23 indicates that the object luminance exceeds the allowable level, the number of divided frames is increased and the gain is changed at the same time (S25). Here, as described using the upper part of FIG. 2, the number of divided frames is increased. In this case, when frame division is not performed currently (i.e., when number of divided frames is one (1) or less than 1), the number of divided frames is set to two. When the current number of divided frames is two, the number of divided frames is set to three, and so on. The number of divided frames is set to a number obtained by adding one to the current number of divided frames. The system controller 30 controls the image data to be read from the image sensor 4 in accordance with the number of divided frames.

In step S25, as described using the upper part of FIG. 2, the number of divided frames is increased and the gain is also changed. The number of divided frames is an integer that takes a discontinuous value, and therefore when the number of divided frames increase by one, fluctuation of the output level of image data increases, and thus with this increased fluctuation as it is, a user observing the reproduced image will feel discomfort. Then, a gain is applied to the image data to maintain the output level substantially constant to an extent that a user does not feel discomfort. However, the number of divided frames shall not be switched within one frame. The number of divided frames is changed at the switching timing of the frame.

On the other hand, when the result of determination in step S21 indicates that the object luminance has not increased, then it is determined whether or not the object luminance has decreased (S27). Here, the exposure detection section 21 determines a change in the object luminance, based on the image data. If the result of this determination indicates that the object luminance has not decreased, i.e., the object luminance has hardly changed, the flow returns to step S21 and the determination is continued.

If the result of determination in step S27 indicates that the object luminance has decreased, it is determined whether or not the object luminance is below the allowable level (S29). When the object luminance has gradually decreased, whether or not the object luminance is lower than the allowable value is determined based on the object luminance detected by the exposure detection section 21. The allowable value may be the same as the value in step S23, or may be found with reference to a table or by calculation so that the allowable value varies with the number of divided frames. When the result of this determination indicates that the object luminance is not below the allowable level, the flow returns to step S21.

When the result of determination in step S29 indicates that the object luminance exceeds the allowable level, it is then determined whether or not the frame is being divided (S31). In step S25 or in step S33 described later, the object luminance may decrease in obtaining image data while dividing the frame. In this step, it is determined whether or not one frame has been divided into two or more frames.

When the result of the determination in step S31 indicates that one frame is being divided, the number of divided frames is reduced and the gain is changed at the same time (S33). Since the results of the determination in step S27 and step S29 indicate that there is a decrease in the object luminance exceeding the allowable value, the number of divided frames is reduced as described in the lower part of FIG. 2. In this case, the number of divided frames is set to a number obtained by subtracting one from the current number of divided frames, e.g., when the current number of divided frames is three, the number of divided frames is set to two. The system controller 30 controls the image data to be read from the image sensor 4 in accordance with the number of divided frames. However, as in step S25, the number of divided frames shall not be switched within one frame. The number of divided frames is changed at the switching timing of the frame.

In step S33, as described using the lower part of FIG. 2, the number of divided frames is decreased and the gain is also changed. The number of divided frames is an integer that takes a discontinuous value, and therefore when the number of divided frames decreases by one, fluctuation of the output level of image data increases, and thus with this increased fluctuation of the output level of image data as it is, a user who observes the reproduced image will feel discomfort. Then, a gain is applied to the image data to maintain the output level substantially constant to an extent that a user does not feel discomfort.

On the other hand, when the result of the determination in step S31 indicates that one frame is not being divided, the gain is changed (S35). In this case, because the result of the determination in step S27 indicates that the object luminance has decreased and the result of the determination in step S31 indicates that one frame is not being divided, the number of divided frames cannot be further decreased and a gain is applied to image data in order to set an appropriate image output level to the image data.

Once the number of divided frames, the gain, and the like are changed in step S25 and step S33, image synthesis is performed (S37). Here, using the image data of a plurality of divided frames, the synthesis processing section 14 performs the synthesis processing, such as addition average synthesis and comparative bright synthesis, to generate one frame of image data.

Once image synthesis is performed in step S37 or once the gain is changed in step S35, it is determined whether or not to finish recording (S39). In finishing moving image photographing, because the user operates the video button (or release button) again, here the determination is made based on a signal indicative of the operation state of the video button (or release button) that is sent from the input IF 38.

When the result of the determination in step S39 indicates that the recording is not complete, the flow returns to step S21, and imaging is performed and the above-described procedure is repeated. Meanwhile, every time one frame of image data is output, the image data for a moving image is generated and recorded on the external memory 36. Note that, when compression in the time-axis direction is performed, several frames of image data are processed and then recorded on the external memory 36. On the other hand, when the result of the determination in step S39 indicates that the recording is complete, this flow is terminated and the power is turned off.

As described above, according to an embodiment of the present invention, there is provided an imaging device that photographs a moving image, comprising: an imaging unit 1 configured to repeatedly obtain image data of one frame in a first cycle, further divide a period of the one frame into periods of a predetermined number of divided frames, and repeatedly output divided image data for each divided frame; a gain application section 15 configured to detect object luminance and apply a gain to a plurality of pieces of divided image data output from the imaging unit; and a synthesis processing section 14 configured to combine the plurality of pieces of divided image data, to which the gain is applied by the gain application section 15, to generate combined image data of one frame, wherein, when the plurality of pieces of divided image data is obtained in the imaging unit, the number of divided frames is not changed during the period of the first cycle, and the gain is changed so as to obtain substantially the same image output level during the period of the first cycle (see FIG. 3A and FIG. 3B). That is, as the object luminance increases or decreases, the number of divided frames is changed and the gain is changed in accordance with this change of the number of divided frames. Then, one frame of images is photographed, and then in photographing the next one frame of images, the number of divided frames is changed. Therefore, a moving image that does not give a user any feeling of cutoff can be photographed even if the object luminance varies.

In one embodiment of the present invention, when the shutter speed is faster than an exposure period of one frame, the exposure period of one frame is divided and the image data is obtained using the whole exposure period of the divided frames. Therefore, exposure is not interrupted during one frame and the image can be continuously obtained. Moreover, synthesis processing is performed using a plurality of pieces of image data obtained by the frame division to obtain one frame of images. Therefore, the image data of an appropriate level can be obtained for each frame.

In one embodiment of the present invention, a combined image is generated by multiplying the output from an imaging element for each divided frame by a gain and then combining images, but the output for each divided frame may be combined to obtain an image and then a combined image may be generated by multiplying the image by a gain. In this case, a part of the sequence of the procedure differs as shown in FIG. 6.

This variation is described using a flowchart shown in FIG. 6. In FIG. 6, the step of performing the same processing as in the flowchart shown in FIG. 5 is labeled with the same step number to omit the detailed description, and the description is provided focusing on differences.

When the result of the determination in step S23 indicates that the object luminance exceeds the allowable level, the flow transitions to step S25a and the number of divided frames is increased. Upon completion of obtaining the images by the number of divided frames, image synthesis is performed in step S37. Subsequently, in step S38, the gain is changed and an image is generated by multiplying the combined image generated in step S37 by the gain. Subsequently, the flow transitions to step S39.

When the result of the determination in step S29 indicates that the object luminance is below the allowable level and when the result of the determination in step S31 indicates that the frame is being divided, the flow transitions to step S33a and the number of divided frames is reduced. Subsequently, the flow transitions to step S37 and the above-described image synthesis processing is performed.

As described above, two types of processing methods have been shown: a method for performing image synthesis after multiplying an image of a divided frame by a gain; and a method for multiplying a gain after performing image synthesis. However, when implemented as a program, two types of methods may be switched in accordance with the situation so that the processing time becomes the shortest depending on the functions of hardware, the computing power for performing image processing, and/or the free space of a work area.

Note that, in one embodiment of the present invention, the image processing unit 10, level determination section 17, number-of-divided-frames detection section 19, exposure detection section 21, record format setting section 23, and the like are configured independently of the system controller 30, but needless to say that all of or a part of each section may be configured by software and performed by the system controller 30.

In one embodiment of the present invention, as the device for photographing, a digital camera has been used and described, but as the camera, a digital single lens reflex camera or a compact digital camera may be used, or a camera, such as a video camera or a movie camera, for photographing a moving image may be used. Furthermore, a camera incorporated into a portable telephone, a smart phone, a Personal Digital Assist (PDA), a personal computer (PC), a tablet type computer, a game machine, or the like may be used. In any case, the present invention is applicable to any device configured to photograph a moving image.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' component,'element,' module,'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device that photographs a moving image, comprising:
   an imaging unit configured to repeatedly obtain image data of one frame in a first cycle having a rate corresponding to a frame rate, further divide a period of the one frame into a predetermined number of divided frames defining a second cycle so that each of the divided frames within the one frame has a same duration, and repeatedly output divided image data for each divided frame;
a gain application section configured to detect object luminance and apply a gain to a plurality of pieces of divided image data output from the imaging unit; and
a synthesis processing section configured to combine the plurality of pieces of divided image data, to which the gain is applied by the gain application section, to generate combined image data of one frame,
wherein, when the plurality of pieces of divided image data is obtained in the imaging unit, the number of divided frames is not changed during the period of the one frame, and when the number of divided frames is changed for a next frame at the first cycle rate, the gain application section changes the gain so as to obtain substantially the same image output level in the next frame in order to suppress a change in brightness of the combined image data of the one frame and the combined image data of the next frame.

2. The imaging device according to claim 1, wherein the second cycle and a change of the gain are in synchronization with a change timing at the image of one frame constituting the moving image.

3. The imaging device according to claim 1, wherein the synthesis processing section performs image synthesis to generate image data of one frame using all pieces of divided image data read during a period constituting one frame.

4. A control method for an imaging device that photographs a moving image, the method comprising:
an imaging step of repeatedly obtaining image data of one frame in a first cycle having a rate corresponding to a frame rate, further dividing a period of the one frame into a predetermined number of divided frames defining a second cycle so that each of the divided frames within the one frame has a same duration, and repeatedly outputting divided image data for each divided frame;
a gain application step of detecting object luminance and applying a gain to a plurality of pieces of divided image data output in the imaging step; and
a synthesis processing step of combining the plurality of pieces of divided image data, to which the gain is applied in the gain application step, to generate combined image data of one frame,
wherein, when the plurality of pieces of divided image data is obtained in the imaging step, the number of divided frames is not changed during the period of the one frame, and when the number of divided frames is changed for a next frame at the first cycle rate, the gain application step changes the gain so as to obtain substantially the same image output level in the next frame in order to suppress a change in brightness of the combined image data of the one frame and the combined image data of the next frame.

5. An imaging device that photographs a moving image, comprising:
an imaging unit configured to repeatedly obtain image data of one frame in a first cycle having a rate corresponding to a frame rate, further divide a period of the one frame into a predetermined number of divided frames defining a second cycle so that each of the divided frames within the one frame has a same duration, and repeatedly output divided image data for each divided frame;
a synthesis processing section configured to combine a plurality of pieces of divided image data output from the imaging unit, to generate combined image data of one frame; and
a gain application section configured to detect object luminance, apply a gain to a combined image generated from the synthesis processing section, and output image data,
wherein, when the plurality of pieces of divided image data is obtained in the imaging unit, the number of divided frames is not changed during the period of the one frame, and when the number of divided frames is changed for a next frame at the first cycle rate, the gain application section changes the gain so as to obtain substantially the same image output level in the next frame in order to suppress a change in brightness of the combined image data of the one frame and the combined image data of the next frame.

6. A control method for an imaging device that photographs a moving image, the method comprising:
an imaging step of repeatedly obtaining image data of one frame in a first cycle having a rate corresponding to a frame rate, further dividing a period of the one frame into a predetermined number of divided frames defining a second cycle so that each of the divided frames within the one frame has a same duration, and repeatedly outputting divided image data for each divided frame;
a synthesis processing step of combining a plurality of pieces of divided image data output in the imaging step, to generate combined image data of one frame; and
a gain application step of detecting object luminance and applying a gain to a combined image output in the synthesis processing step, wherein, when the plurality of pieces of divided image data is obtained in the imaging step, the number of divided frames is not changed during the period of the one frame, and when the number of divided frames is changed for a next frame at the first cycle rate, the gain application step changes the gain so as to obtain substantially the same image output level in the next frame in order to suppress a change in brightness of the combined image data of the one frame and the combined image data of the next frame.

7. A non-transitory computer-readable medium storing a computer program for controlling an imaging device that photographs a moving image, the computer program causing a computer to execute a control method, the method comprising:
an imaging step of repeatedly obtaining image data of one frame in a first cycle having a rate corresponding to a frame rate, further dividing a period of the one frame into a predetermined number of divided frames defining a second cycle so that each of the divided frames within the one frame has a same duration, and repeatedly outputting divided image data for each divided frame;
a gain application step of detecting object luminance and applying a gain to a plurality of pieces of divided image data output in the imaging step; and
a synthesis processing step of combining the plurality of pieces of divided image data, to which the gain is applied in the gain application step, to generate combined image data of one frame, wherein, when the plurality of pieces of divided image data is obtained in the imaging step, the number of divided frames is not changed during the period of the one frame, and when the number of divided frames is changed for a next frame at the first cycle rate, the gain application step changes the gain so as to obtain substantially the same image output level in the next frame in order to suppress a change in brightness of the combined image data of the one frame and the combined image data of the next frame.

8. A non-transitory computer-readable medium storing a computer program for controlling an imaging device that photographs a moving image, the computer program causing a computer to execute a control method, the method comprising:

an imaging step of repeatedly obtaining image data of one frame in a first cycle having a rate corresponding to a frame rate, further dividing a period of the one frame into a predetermined number of divided frames defining a second cycle so that each of the divided frames within the one frame has a same duration, and repeatedly outputting divided image data for each divided frame;

a synthesis processing step of combining a plurality of pieces of divided image data output in the imaging step, to generate combined image data of one frame; and a gain application step of detecting object luminance and applying a gain to a combined image output in the synthesis processing step, wherein, when the plurality of pieces of divided image data is obtained in the imaging step, the number of divided frames is not changed during the period of the one frame, and when the number of divided frames is changed for a next frame at the first cycle rate, the gain application step changes the gain so as to obtain substantially the same image output level in the next frame in order to suppress a change in brightness of the combined image data of the one frame and the combined image data of the next frame.

* * * * *